Aug. 5, 1958 B. M. HYMAN 2,846,053
FLIGHT CHAIN MOUNTING FOR PORTABLE ELEVATORS
Filed Aug. 6, 1956
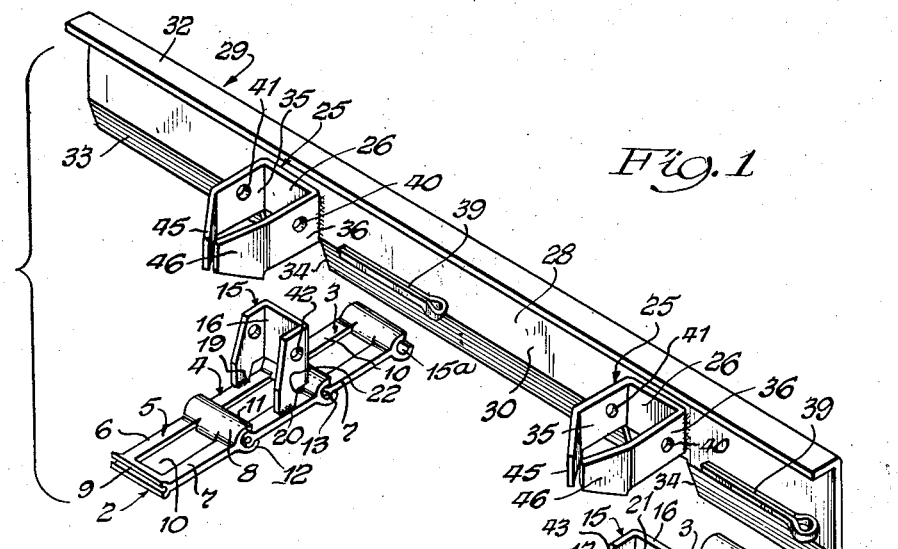
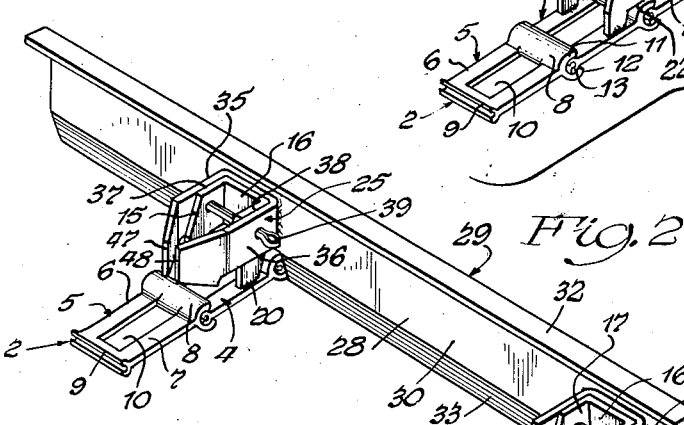
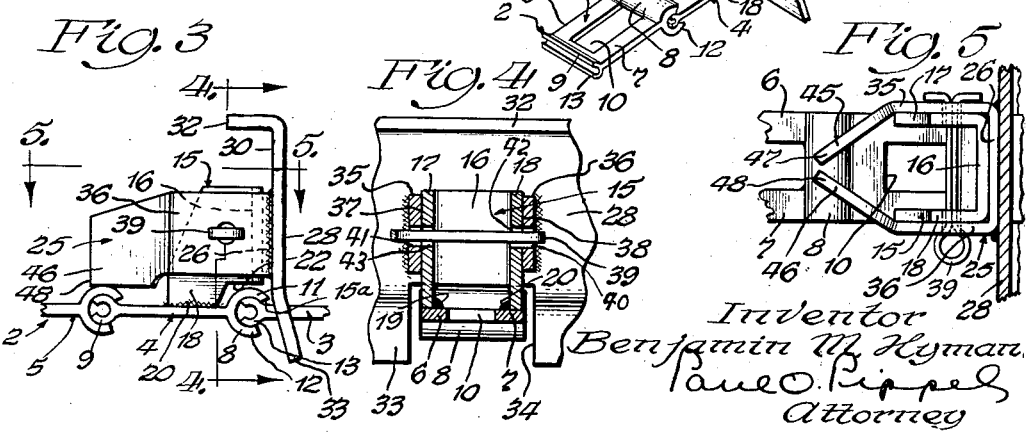
Inventor
Benjamin M. Hyman
Paul O. Pippel
Attorney

United States Patent Office 2,846,053
Patented Aug. 5, 1958

2,846,053

FLIGHT CHAIN MOUNTING FOR PORTABLE ELEVATORS

Benjamin M. Hyman, Moline, Ill., assignor to International Harvester Company, a corporation of New Jersey Application August 6, 1956, Serial No. 602,256

7 Claims. (Cl. 198—175)

This invention relates to conveyors and more specifically to a flight mounting on the actuating chains.

A general object of the invention is to provide a simple and effective mounting for a flight for connecting the same to one or more chains by which the flight is driven and wherein the connection facilitates assembly and disassembly.

A more specific object of the invention is to provide such a connection between a chain and a flight, the connection including a load transferring device for spreading the loads imposes on the flight over more than one link.

A still further object of the invention is to provide a connection which is characterized by exceptional strength and which controls the disposition of the flight so that it is substantially normal to the direction of movement of the conveyor and for maintaining the chains generally parallel and properly laterally spaced.

These and other objects of the invention will become more apparent from the specification and the drawings wherein:

Figure 1 is a perspective, partially exploded view of a conveyor assembly incorporating the invention;

Figure 2 is an assembled perspective view;

Figure 3 is a fragmentary side elevational view of the conveyor;

Figure 4 is a transverse sectional view taken substantially on the line 4—4 of Figure 3; and Figure 5 is a longitudinal sectional view taken substantially along the line 5—5 of Figure 3.

Describing the invention in detail and having particular reference to the drawings, there are shown two generally parallel laterally spaced coplanar chains generally designated 2—2 of identical construction and each chain comprises a series of pivotally interconnected links or link elements of identical construction but for purposes of clarity herein identified as 3, 4 and 5, the link 3 being termed as the leading link and the link 5 the trailing link with respect to the flight mounting link 4. It will be understood that these flight mounting links 4 are disposed at regular intervals within the chain links as will be observed in Figures 1 and 2.

Each link is of identical construction and comprises a pair of lengthwise extending side arms or portions 6 and 7 which are interconnected by leading and trailing cross-member portions 8 and 9 which collectively define a rectangular structure providing a sprocket receiving slot 10.

Each leading member includes jaw portions 11 and 12 which are of arcuate contour and embrace the fabricated pintle portion 13 which is developed by the trailing cross-element 9 and which fits within the jaw 11 of the trailing link, the side arms 6 and 7 projecting ahead of the trailing link through a slot 15a at the open end of the jaw. This construction is well-known in the art and therefore its discussion herein is only limited to the amount necessary to provide the environment for the invention.

Corresponding links 4—4 are aligned in a line substantially perpendicular to the direction of operation of the conveyor and each of these links 4 carries a U-shaped mounting bracket 15 extending outwardly of the chain and the bracket having a base or a bight portion 16 which proximately overlies the leading cross-element 8 of the associated link, the base portion 16 being connected to spaced side portions or flanges 17 and 18 which along their inner edges are connected as by welding as at 19 and 20 to the external sides of the side portions 6 and 7 of the associated link 4. It will be seen that the side portions 17 and 18 may be cut out adjacent to their inner edges as at 21 and 22 to accommodate positioning of the base portion 16 in alignment with the leading member 8 of the link 4.

Each inner bracket 15 has an outer bracket 25 telescoped thereover, the outer bracket also being substantially U-shaped and including a base or bight portion 26 which generally parallels the plate-like center portion 28 of the flight structure generally indicated 29, the forward or leading side of the base portion 26 being welded to the backside 30 of the plate portion 28. Preferably, the structure 29 comprises an upward or outer flange 32 which is bent or extends in a trailing direction substantially parallel to the plane of the conveyor and the flight has a lower edge portion 33 which is angled in a leading direction inwardly of the conveyor, the inner edge portion 33 being notched as at 34 and receiving the respective chain links 4, 4 therethrough whereby the inner portion 33 extend inwardly of the chains 2, 2.

The outer brackets 25, in addition to the base portion 26, comprise a pair of side portions or flanges 35 and 36 which are disposed outwardly of the side flanges 17 and 18 of the associated inner bracket for abutment therewith as at 37 and 38 to control lateral displacement of the flight 29 with respect to the chains and also to prevent lateral canting of the flight with respect to the chains. As best seen in Figure 5, in the assembled position of the parts the base portion 26 seats against the base portion 16 and the side members 35 and 36 seat against the side members 17 and 18.

The flight is held in assembly by means of pins which are herein shown as cotter keys 39 which extend through aligned apertures 40, 41, 42, 43 in the flanges of the outer and inner brackets respectively, the axis of the pin being substantially parallel to the plane of the flight which extends substantially normal to the chains.

The side flanges 17 and 18 of the inner brackets are relatively short in the longitudinal direction of the chains and terminate intermediate the ends of the side arms 6 and 7 of the related link whereas the side flanges 35 and 36 of the outer brackets have trailing or rearward portions or extremities 45 and 46 which are bent behind the flanges 17 and 18 and disposed in a converging relationship in a trailing direction and the rear ends 47 and 48 of these side portions 35 and 36 overhang the leading member 8 of the trailing link 5 and provide a load transfer from the flight 29 when it is engaging a load tending to swing the outer edge of the flight in a trailing direction, against the pivot 15. Thus the extension of the outer bracket serves as a load-transferring means so that the load is distributed between the flight mounting link and the next succeeding trailing link so as to resist humping of the flight mounting links especially when they are passing over the associated sprockets. This feature prevents the chains from slipping off the sprockets and by distributing the loading functions to resist bending and breaking of the flight mounting links.

It will be understood that the specific embodiment herein disclosed is merely by way of illustration and not limitation and that the invention can take various forms as will be readily understood by those skilled in the art and as covered in the appended claims.

What is claimed is:

1. The combination of a pair of parallel laterally spaced chains of the type comprising interconnected links and each link including leading and trailing cross-elements spaced lengthwise of the chain and a pair of side elements between and integrally united with said cross-elements and each leading and trailing cross-element formed and arranged to interlock with the trailing and leading elements respectively of the next adjacent leading and trailing links, a U-shaped bracket comprising a pair of side portions and a transverse bight portion, said side portions connected to respective side elements and said bight portion spaced from the leading element in a trailing direction, a flight extending transversely of said chains and connected to the brackets on respective chains, and a load transfer element connected to said flight and extending in a trailing direction over at least one of said side elements and having a trailing end portion angled toward the longitudinal center of the chain and terminating substantially medially of the leading cross-element of the adjacent trailing link for contact therewith at a point intermediate its ends upon the imposition of a load against the flight.

2. The combination of a chain of the type comprising interconnected links and each link including leading and trailing cross-elements spaced lengthwise of the chain and a pair of side elements between and integrally united with said cross-elements, a U-shaped bracket comprising a pair of side portions and a transverse bight portion, said side portions being in transverse alignment and connected to respective side elements and said bight portion disposed adjacent to the leading element of the associated link, a flight extending transversely of said chain and connected to the bracket, and a load transfer element connected to said flight and having a portion extending in a trailing direction in transverse alignment with at least one of said side elements and over the leading cross-element of the adjacent trailing link for contact therewith upon the imposition of a load against the flight, said portion having a part angled behind the bracket and engaging a side of the bracket remote from the flight.

3. The combination of a chain of the type comprising interconnected links, each link including a leading cross-element and a trailing cross-member and a pair of laterally spaced side members, a flight extending across the chain, means connecting said flight to at least one of said members, and load-transferring means connected to said flight member and extending in a trailing direction to the leading cross-element of the next adjacent link and disposed in abuttable relationship thereto for contacting the same upon the imposition of a predetermined load against the flight, said means comprising an element having a portion disposed in transverse alignment with at least one of said side members and having a portion bent behind said side members.

4. The combination of a chain of the type comprising interconnected links, each link including a leading cross-element and a trailing cross-member and a pair of laterally spaced side members, a flight extending across the chain, means connecting said flight to at least one of said members, and load-transferring means connected to said flight member and extending in a trailing direction to the leading cross-element of the next adjacent link and disposed in abuttable relationship thereto for contacting the same upon the imposition of a predetermined load against the flight, and said first and second means comprising a pair of telescoped brackets connected respectively to the related link and to said flight and including a pair of side portions on one bracket connected to the side members of the related link and a pair of side portions on the other bracket flanking the side portions of said one bracket, and said side portions of said other bracket having trailing extremities converging in a trailing direction behind said side portions of the one bracket and overlying the cross-element of the next succeeding trailing link, and said connecting means including a pin extending through aligned apertures in the side portions of both brackets.

5. In a chain flight conveyor, the combination of a pair of parallel link chains, each composed of a series of rectangular link elements, link elements of both chains lying opposite to each other on a line normal to the length of the conveyor, each link element including a pair of parallel side arms and end cross-members connecting the side arms, and pivotal connections between the proximate end cross-members of successive link elements of both chains, a flight member comprising an elongated structure lying substantially within a plane normal to the length of the conveyor, means connecting said structure to each of said oppositely disposed link elements, and load-transfer means connected to said structure and extending in a trailing direction therefrom to the adjacent pivotal connection between successive link elements of each chain and disposed in load-imposing relationship thereto upon the application of a load to the flight, and said load transfer means being disposed in transverse alignment with the respective arms and having portions engaging behind the arms in embracing relation thereto.

6. In a chain flight conveyor, the combination of a pair of parallel link chains, each composed of a series of rectangular link elements, link elements of both chains lying opposite to each other on a line normal to the length of the conveyor, each link element including a pair of parallel side arms and end cross-members connecting the side arms, and pivotal connections between the proximate end cross-members of successive link elements of both chains, a flight member comprising an elongated structure lying substantially within a plane normal to the length of the conveyor, means connecting said structure to each of said oppositely disposed link elements, and load-transfer means connected to said structure and extending in a trailing direction therefrom to the adjacent pivotal connection between successive link elements of each chain and disposed in load-imposing relationship thereto upon the application of a load to the flight, and each said connecting means including a pair of telescoped inner and outer U-shaped brackets disposed outwardly of each said oppositely disposed link member and each bracket comprising a pair of side flanges and a base portion extending between and connected to said side flanges, the side flanges of both brackets extending from the associated base element in the direction of the length of the chain and having their inner edges registered with and connected to the parallel side arms of the corresponding chain link element, the base portions of the inner and outer brackets being disposed in opposing engaging relationship and the base portion of each outer bracket generally paralleling said structure and directly connected thereto, the side flanges of the outer brackets embracing the side portions of the respective inner brackets, a pin extending through registering holes in the side flanges of associated inner and outer brackets, and said side flanges of the outer brackets extending in a trailing direction beyond the inner brackets and overlying the adjacent pivotal connection.

7. The invention according to claim 6 and said side flanges of the outer brackets having trailing portions bent behind the side flanges of the related inner bracket.

References Cited in the file of this patent

UNITED STATES PATENTS

| | | |
|---|---|---|
| 668,079 | Baker | Feb. 12, 1901 |
| 1,174,965 | Brown | Mar. 14, 1916 |
| 1,638,267 | Morehead et al. | Aug. 9, 1927 |
| 1,758,484 | Van Slyke | May 13, 1930 |
| 2,101,353 | Waalkes | Dec. 7, 1937 |
| 2,435,768 | Biggs | Feb. 10, 1948 |
| 2,703,170 | Dmohowski | Mar. 1, 1955 |